Figure 1:
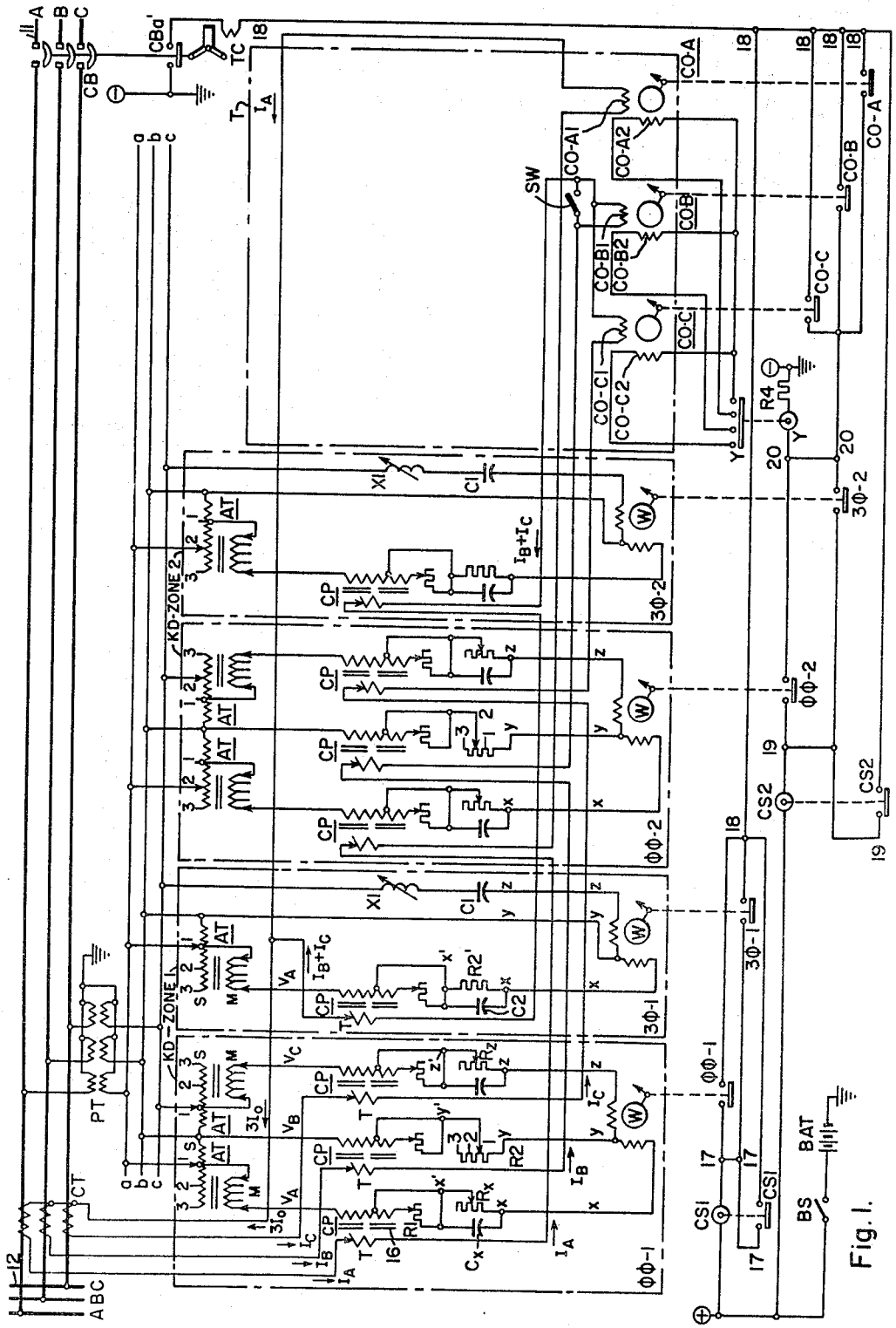

INVENTORS
John L. Blackburn &
William E. Glassburn.

United States Patent Office 3,178,616
Patented Apr. 13, 1965

3,178,616
EQUIPMENT FOR PROTECTING ELECTRICAL SYSTEMS INCLUDING INVERSE-TIME-DELAY RESPONSE
John L. Blackburn, Basking Ridge, and William E. Glassburn, Mountainside, N.J., assignors to Westinghouse Electric Corporation, East Pittsburgh, Pa., a corporation of Pennsylvania
Filed May 9, 1961, Ser. No. 108,925
12 Claims. (Cl. 317—28)

This invention relates to equipment for protecting electrical systems and it has particular relation to distance-supervised overcurrent relays for protecting electrical transmission lines.

It has been conventional practice to employ single-phase inverse-time overcurrent relays and single-phase directional inverse-time overcurrent relays for protecting radial and loop transmission line systems. A discussion of systems employing such relays will be found in the book entitled "Silent Sentinels," published by the Westinghouse Electric Corporation, Newark, N.J., in 1949. Among the problems encountered in such applications of overcurrent relays are those of "ratcheting" of the overcurrent relays and the difficulty in some cases of adjusting the overcurrent relays to discriminate between heavy load currents and small fault currents. The expression "ratcheting" refers to an operation in which closely successive fault currents which are not intended to operate an overcurrent relay successively actuate the overcurrent relay until the relay finally closes its contacts.

Single-phase distance relays may be employed for supervising the overcurrent relays. However, the amount and complexity of such equipment may be objectionable, particularly for the shorter and lower-voltage transmission lines such as those known as sub-transmission lines which operate at voltages of the order of 33,000 volts phase-to-phase or less.

In accordance with the invention, a polyphase distance relay supervises overcurrent relays. Thus, a single polyphase distance relay may supervise a plurality of single-phase overcurrent relays. In a preferred embodiment of the invention first and second-zone distance relaying units are provided and the overcurrent relays are supervised by the second-zone distance relaying unit.

The invention also contemplates a polyphase distance relay associated with a plurality of directional time overcurrent relays. The distance relay and the directional time overcurrent relays independently control the tripping of a common circuit breaker. The distance relay may be set to provide instantaneous tripping for 90% of the first zone of an electrical system. The overcurrent relays provide protection for the second zone of the system and coordinate with other overcurrent relays on the system. If the directional feature is not required, as on radial systems, it may be omitted.

It is therefore an object of the invention to provide improved equipment for protecting an electrical system wherein overcurrent relays are supervised by other relays.

It is also an object of the invention to provide equipment for protecting an electrical system wherein a polyphase distance relay supervises the operation of overcurrent relay means.

It is an additional object of the invention to provide improved equipment for protecting an electrical system wherein a polyphase distance relay is associated with overcurrent relay means.

Figure 2:
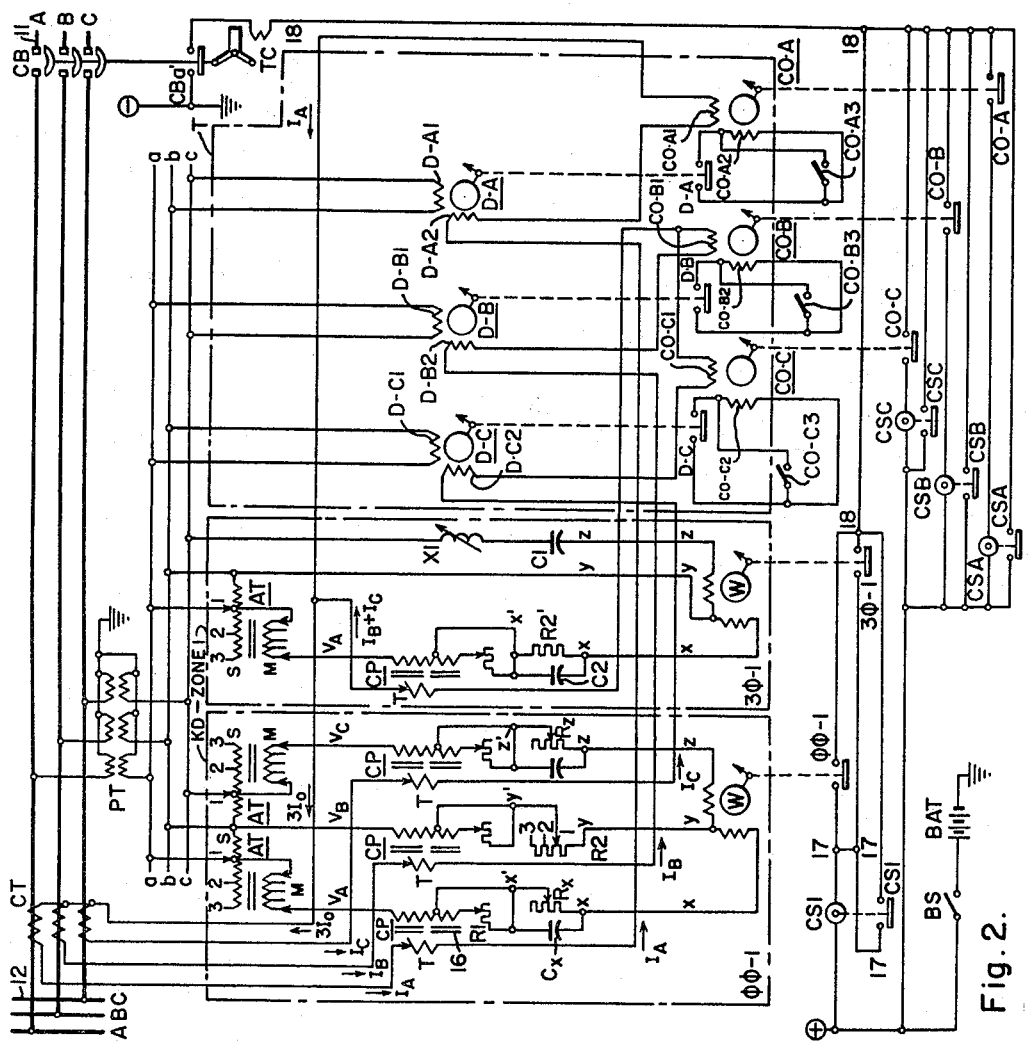

Other objects of the invention will be apparent from the following description taken in conjunction with the accompanying drawings, in which:

FIGURE 1 constitutes a diagrammatic representation of circuits and apparatus for embodying the invention in protective equipment for protecting a three phase power line; and FIG. 2 constitutes a diagrammatic representation of a modified form of the invention.

FIGURE 1 includes distance relaying units of the compensator type which are discussed in three papers appearing in the June 1958 issue of the American Institute of Electrical Engineers Transactions, Power Apparatus and Systems, published by the American Institute of Electrical Engineers, New York City, papers 58–26, 20 and 19. Similar relay units are also disclosed in the Sonnemann Patent No. 2,973,459, which issued February 28, 1961. In order to simplify the presentation of the invention, a substantial portion of the equipment shown in FIGURE 1 is based on that disclosed in the Sonnemann patent, and similar components are identified by the same reference characters employed in the Sonnemann patent. For convenience the following list presents components and quantities of FIGURE 1 which are similar to components and quantities bearing the same reference characters in the aforesaid Sonnemann patent:

Components also in Patent 2,973,459

11—three-phase line-section
12—three-phase bus
CB—circuit breaker
TC—circuit breaker trip coil
CT—line-current transformers
$I_A$, $I_B$, $I_C$—line-currents
$I_0$—zero-sequence component of line currents
PT—potential transformers
abc—relay voltage bus
KD–Zone 1, KD–Zone 2—relaying units for two zones
$\phi\phi$–1, $\phi\phi$–2—phase-fault units for first and second zones respond to double-line faults
$3\phi$–1, $3\phi$–2—three-phase unit for first and second zones responds to three-phase faults
CS1, CS2—contactor switches
AT—autotransformers
CP—compensators
W—relay Briefly, FIGURE 1 shows a relaying station for a three-phase line-section 11. A first zone of the line section is protected by a relaying unit KD–zone 1. This relaying unit includes a phase fault unit $\phi\phi$–1 which responds to double-line faults occurring in the first zone of the line section 11. The relaying unit KD–zone 1 also includes a three-phase unit $3\phi$–1 which responds to three-phase faults occurring in the first zone of the line section 11.

A double-line fault or a three-phase fault occurring in the first zone of the line section 11 results in closure of the make contact $\phi\phi$–1 or $3\phi$–1 to complete a tripping circuit for the circuit breaker CB which is identical to the corresponding tripping circuit of the aforesaid Sonnemann patent. This tripping circuit may be traced from the positive bus (+) through the operating coil of a contactor switch CS1, a circuit 17, the make contact $\phi\phi$–1 of the first-zone phase-fault unit $\phi\phi$–1 or the make contact $3\phi$–1 of the first zone three-phase unit $3\phi$–1, the tripping circuit 18, the trip coil TC of the circuit breaker CB and finally through an auxiliary circuit-breaker make contact CBa' to a negative bus (−). The circuit-breaker make contact CBa' is closed when the circuit breaker CB is closed. The circuits are all illustrated with switches and relays open or deenergized. When the contactor switch CS1 is energized it closes its make contact to establish a holding circuit around the make contact $\phi\phi$–1 and the make contact $3\phi$–1. A more detailed description of the relaying unit KD–zone 1 and of its operation will be found in the aforesaid Sonnemann patent.

FIGURE 1 also discloses a relaying unit KD-zone 2.

This relaying unit includes a phase-fault unit φφ-2 which responds to double-line faults occurring in the second zone of the line section 11. The relaying unit KD-zone 2 also includes a three-phase unit 3φ-2 which responds to three-phase faults occurring in the second zone of the line section 11. The relaying unit KD-zone 2 of FIGURE 1 operates in precisely the same manner as the same unit shown in the aforesaid Sonnemann patent. However, in the present FIGURE 1 this relaying unit is employed for supervising the operation of one or more overcurrent relays. In a preferred embodiment of the invention, two overcurrent relays are supervised and in the specific embodiment of FIGURE 1 three overcurrent relay CO–A, CO–B and CO–C in an enclosure T are shown to be supervised by the relaying unit KD-zone 2.

The three overcurrent relays CO–A, CO–B and CO–C are similar in construction but are associated respectively with the three phases A, B and C of the line section 11. Induction-type time-delay overcurrent relays of suitable construction are discussed in the aforesaid "Silent Sentinels," on pages 116 to 119. Another construction suitable for the induction-type time-delay overcurrent relay is that shown in the Sonnemann Patent 2,697,187 which issued December 14, 1954.

The overcurrent relay CO–A1 has a main winding CO–A1 which is connected for energization in accordance with the line current $I_A$. However, the overcurrent relay CO–A is in effective condition only when the make contact φφ-2 of the phase fault unit or the make contact 3φ-2 of the three-phase unit is closed.

The effectiveness of the overcurrent relay is controlled by the condition of an auxiliary winding CO–A2. The relay is in an effective condition only when the auxiliary winding has its terminals connected to each other. The auxiliary winding CO–A2 has its terminals connected to each other when an effectuating relay Y is energized and picked up. This effectuating relay is energized and picked up upon closure of the make contact φφ-2 or the make contact 3φ-2 through a circuit which may be traced from the positive bus (+) through the energizing coil of a second contactor switch CS2, a circuit 19, the make contact φφ-2 of the second-zone phase-fault unit or the make contact 3φ-2 of the second-zone three-phase unit, a circuit 20, the operating coil of the effectuating relay Y, a resistor R4 and a circuit 21 to the negative bus (−). Current flowing through this circuit is insufficient to pick up the second contactor switch CS2.

When placed in effective condition, the overcurrent relay CO–A starts to time out. Upon expiration of the time delay for which it is designed the overcurrent relay closes its make contact CO–A to complete an energizing circuit for the trip coil TC of the circuit breaker CB. This may be traced from the positive bus (+) through the energizing coil of the second contactor switch CS2, the circuit 19, one of the contacts φφ-2 or 3φ-2, a circuit 20, the make contact CO–A of the overcurrent relay, the circuit 18, the trip coil TC, and the auxiliary make contact CBa' to the negative bus (−). The current through this circuit suffices to pick up the second contactor switch CS2, which establishes a holding circuit around the contacts φφ-2, 3φ-2 and CO–A.

The overcurrent relays CO–B and CO–C are similar in construction to the relay CO–A and are similarly placed in effective condition by operation of the effectuating relay Y. However, the main windings of the relays CO–B and CO–C are energized respectively in accordance with the currents $I_B$ and $I_C$ of the line section 11.

Generally, two overcurrent relays suffice and this may be represented in FIG. 1 by closing a manual switch SW which shunts the main winding of the relay CO–B. This in effect removes the relay CO–B from the system.

The operation of the complete system shown in FIG. 1 may be reviewed briefly. It will be assumed that the circuit breaker CB is closed and that the remaining components are in the conditions illustrated in FIGURE 1. In accordance with the principles set forth in the aforesaid papers on "Compensator Distance Relaying," and in the Sonnemann Patent 2,973,459, the KD-zone 1 relaying unit may be adjusted to protect instantaneously up to 90% of the protected line section. Thus, if a line-to-line fault or a three-phase fault occurs in zone 1 of the line section 11 the phase-fault unit φφ-1 or the three-phase 3φ-1 for zone 1 operates instantaneously to complete a tripping circuit for the circuit breaker CB.

As pointed out in the papers entitled "Compensator Distance Relaying," previously cited and in the Sonnemann Patent 2,973,459 the zone 2 protected by the relaying unit KD-zone 2 may include not only zone 1 but also up to approximately 50% of the adjacent line section. If a line-to-line fault or a three-phase fault occurs in zone 2, the phase-fault unit φφ-2 or three-phase unit 3φ-2 operates to close its make contact to complete an energizing circuit for the auxiliary relay Y. The effectuating relay Y places the overcurrent relays CO–A, CO–B and CO–C in effective condition. It will be assumed that this condition continues long enough for one of the relays such as the relay CO–A to time out. At the end of its time delay, which varies as an inverse function of the energization of the winding CO–A1, the overcurrent relay CO–A closes its make contacts to complete an energizing circuit for the trip coil TC of the circuit breaker CB. It is possible to set the overcurrent relays to trip for values of current which are lower than maximum normal load currents. Unless a fault occurs which operates the KD-zone 2 relay, the overcurrent relays cannot time out.

In the embodiment of FIG. 2, the first zone phase-fault unit φφ-1 and the first-zone three-phase unit 3φ-1 are associated with the three-phase line section 11 in the same manner show in FIG. 1. Also, these units in FIG. 2 control the circuit breaker CB in the same manner shown in FIG. 1. The embodiment of FIG. 2 does not show the second zone units φφ-2 and 3φ-2 illustrated in FIG. 1.

In addition, FIG. 2 shows the three overcurrent relays CO–A, CO–B and CO–C which have their main windings CO–A1, CO–B1 and CO–C1 energized respectively in accordance with the currents $I_A$, $I_B$ and $I_C$.

When the overcurrent relay CO–A closes its make contacts, it completes a tripping circuit for the circuit breaker CB which may be traced from the positive bus (+) through the energizing coil of a contactor switch CSA, the contacts of the overcurrent relay CO–A, the circuit 18, the trip coil TC and the auxiliary make contact CBa' to the negative bus (−). The contactor switch CSA closes its contacts to establish a holding circuit around the contacts of the overcurrent relay CO–A. In a similar manner each of the overcurrent relays CO–B and CO–C controls the circuit breaker CB.

In FIG. 2, the overcurrent relays CO–A, CO–B and CO–C are supervised by directional relays respectively D–A, D–B and D–C. The directional relays may be of conventional construction. Suitable examples of directional relays will be found in the aforesaid "Silent Sentinels." As a further example, a desirable construction for the directional relay will be found in the Marieni Patent 2,949,515 which issued August 16, 1960.

The directional relay for the phase A is responsive to the directions of power flow for phase A of the line section 11. This relay has a voltage or polarizing winding D–A1 which is connected for energization in accordance with the voltage across the lines B and C. The relay has a current winding D–A2 which is connected for energization in accordance with the line current $I_A$. Thus, the relay D–A operates to close its make contact only when phase A power flow is in a predetermined direction. Closure of the contacts D–A places the overcurrent relay CO–A in effective condition. The directional relays D–B and D–C are similarly constructed and are similarly associated with the phases B and C of the line section 11.

In some systems (such as radial systems), the directional feature is not required and the directional relays may be omitted. This is represented in FIG. 2 by closure of the manual switches CO–A3, CO–B3 and CO–C3. Such closure in effect removes the directional relays from the system and places the overcurrent relays continuously in effective condition.

The operation of the system of FIG. 2 now will be reviewed briefly. The KD–zone 1 relaying unit operates in the manner previously discussed to protect instantaneously up to 90% of the protected line section.

Let it be assumed that a fault occurs on the system which is outside the portion of the zone protected by the KD–zone 1 relaying unit, and which produces a power flow in the proper direction to operate the directional relay D–A. This relay closes its contact to place the overcurrent relay CO–A in effective condition, and the overcurrent relay starts to time out. At the end of its time delay which varies inversely relative to its energizing current, the relay CO–A closes its contact to complete an energizing circuit for the circuit breaker CB. It will be recalled that the overcurrent relays also provide back-up protection for the part of the line section protected by the KD–zone 1 relaying section.

Although the invention has been described with reference to certain specific embodiments thereof, numerous modifications falling within the spirit and scope of the invention are possible.

We claim as our invention:

1. In a relaying assembly, a first three-phase relay unit for protecting a polyphase alternating-current electrical system responsive for operation when energized by alternating voltage and current quantities occurring during line-to-line fault conditions of a three-phase alternating-current electrical system only to a magnitude of a function of impedance having a predetermined angle which falls in a range extending between a first magnitude and a second magnitude, a second three-phase relay unit responsive for operation when energized by alternating voltage and current quantities occurring during faults involving three lines of a three-phase alternating current electrical system to a magnitude of a function of impedance, time-delay relay means responsive to operation of one of said relay units for being transferred from ineffective to effective condition, said time-delay relay means when in effective condition having a time delay which varies inversely relative to the magnitude of the energization of such time-delay relay means, and translating means responsive to operation of the time-delay relay means.

2. In a relaying assembly, a first three-phase relay unit for protecting a polyphase alternating-current electrical system responsive when energized by alternating voltage and current quantities occurring during line-to-line fault conditions of a three-phase alternating current electrical system only to a magnitude of a function of impedance having a predetermined angle which falls in a range extending between a first magnitude and a second magnitude, a second three-phase relay unit responsive for operation when energized by alternating voltage and current quantities occurring during faults involving three lines of a three-phase alternating current electrical system to a magnitude of a function of impedance, three inverse-time-delay overcurrent relay means each responsive to operation of each of said relay units for being transferred from ineffective to effective condition, each of said overcurrent relay means when in effective condition having a time delay in operation which varies inversely relative to the magnitude of the energization of such overcurrent relay unit, and translating means responsive to operation of the overcurrent relay means.

3. In a relaying system for protecting a three-phase electrical system, a plurality of terminals for connection to a three-phase electrical system, a first relay unit responsive for operation only to a magnitude of a function of impedance having a predetermined angle which falls in a first range extending between a first magnitude and a second magnitude for detecting balanced faults on a three-phase electrical system when the relay unit is energized by alternating voltage and current quantities derived from such polyphase electrical system through said terminals, and a second three-phase relay unit responsive for operation to any magnitude of a function of impedance having said predetermined angle and falling within a range extending between said first and second magnitudes for detecting unbalanced faults on a three-phase electrical system when the second relay unit is energized by alternating voltage and current quantities derived from such three-phase electrical system through said terminals, and a plurality of inverse-time-delay overcurrent relay means responsive to operation of each of said relay units for being transferred from an ineffective to an effective condition, each of the overcurrent relay means when in effective condition being responsive to line current of a three-phase electrical system when such system is connected to said terminals.

4. In an electrical relay assembly, a relay unit, a plurality of terminals suitable for energization by alternating quantities, said unit comprising an element responsive to the product of two alternating quantities derived from said terminals when said terminals are energized from an alternating system multiplied by the sine of the angle between said two alternating quantities, a compensator interposed between the terminals and the unit to modify one of the alternating quantities supplied to the unit from said terminals as a function of another alternating quantity derived from said terminals when energized, non-effective inverse-time delay-overcurrent relay means responsive when in effective condition to current passing through one of said terminals, and means responsive to operation of the relay unit for placing the overcurrent relay means in effective condition.

5. A protective-relay combination located at a relay station for responding to certain faults on a three-phase transmission line including means energized from the line voltage at the relaying station for producing a set of derived polyphase voltages having a phase-sequence corresponding to the line voltages, compensating means including a first compensator connected in series with one of said derived voltages and having substantially the same impedance angle as the line impedance of said transmission line for producing a set of compensated polyphase voltages, means for energizing the compensator in accordance with line current flowing in the corresponding line-conductor of the three-phase transmission line, a first polyphase relay element energized from said compensated polyphase voltages for response to a function of the impedance of said transmission line under unbalanced-fault conditions to provide protection against unbalanced faults occurring on a portion of the transmission line, a second polyphase relay element, means energizing the circuits of the second polyphase relay element in accordance with voltages derived from said transmission line, compensating means including a second compensator connected in series with the energization supplied to circuits of the second polyphase relay element, means energizing said second compensator in accordance with a line current of said transmission line for response to a function of the impedance of said transmission line under balanced fault conditions to provide protection against balanced faults occurring in portions of the transmission line, a plurality of non-effective inverse-time-delay overcurrent relay means each responsive for operation when in effective condition to a separate one of the line currents of the transmission line, means responsive to operation of any of said relay elements for placing all of said overcurrent relay means in effective condition, and common protective translating means similarly responsive to operation of each of said overcurrent relay means.

6. In a relaying assembly, first zone and second zone relay composite units; each of said composite units comprising a first three-phase relay unit for protecting a polyphase alternating-current electrical system responsive for operation when energized by alternating voltage and current quantities occurring during line-to-line fault conditions of a three-phase alternating current electrical system only to a magnitude of a function of impedance having a predetermined angle which falls in a range extending between a first magnitude and a second magnitude, and a second three-phase relay unit responsive for operation when energized by alternating voltage and current quantities occurring during faults involving three lines of a three-phase alternating current electrical system to a magnitude of a function of impedance, ineffective time-delay relay means responsive to operation of one of said relay units of the second zone for being transferred from ineffective to effective condition, said time-delay relay means when in effective condition having a time delay which varies inversely relative to the magnitude of the energization of such time-delay relay means, and translating means responsive to operation of the time-delay relay means and to operation of each of the relay units of the first zone.

7. A protective-relaying combination located at a relay station for responding to certain faults on a three-phase transmission line including means energized from the line voltage at the relaying station for producing a set of derived polyphase voltages having a phase-sequence corresponding to the line voltages, first zone and second zone relay composite units; each of said composite units comprising compensating means including a first compensator connected in series with one of said derived voltages and having substantially the same impedance angle as the line impedance of said transmission line for producing a set of compensated polyphase voltages, means for energizing the compensator in accordance with line current flowing in the corresponding line conductor of the three-phase transmission line, a first polyphase relay element energized from said compensated polyphase voltages for response to a function of the impedance of said transmission line under unbalanced-fault conditions to provide protection against unbalanced faults occurring on a portion of the transmission line, a second polyphase relay element, means energizing the circuits of the second polyphase relay element in accordance with voltages derived from said transmission line, compensating means including a second compensator connected in series with the energization supplied to circuits of the second polyphase relay element, means energizing said second compensator in accordance with a line current of said transmission line for response to a function of the impedance of said transmission line under balanced fault conditions to provide protection against balanced faults occurring in a portion of the transmission line, a plurality of ineffective inverse-time-delay overcurrent relay means each responsive for operation when in effective condition to a separate one of the line currents of the transmission line, means responsive to operation of any of said relay elements of the second zone for placing all of said overcurrent relay means in effective condition, and common protective translating means similarly responsive to operation of each of said overcurrent relay means, and to operation of each of the relay elements of the first zone.

8. A protective-relaying combination located at a relay station for responding to certain faults on a three-phase transmission line including means energized from the line voltage at the relaying station for producing a set of derived polyphase voltages having a phase-sequence corresponding to the line voltages, compensating means including a first compensator connected in series with one of said derived voltages and having substantially the same impedance angle as the line impedance of said transmission line for producing a set of compensated polyphase voltages, means for energizing the compensator in accordance with line current flowing in the corresponding line conductor of the three-phase transmission line, a first polyphase relay element energized from said compensated polyphase voltages for response to a function of the impedance of said transmission line under unbalanced-fault conditions to provide protection against unbalanced faults occurring on a portion of the transmission line, a second polyphase relay element, means energizing the circuit of the second polyphase relay element in acordance with voltages, derived from said transmission line, compensating means including a second compensator connected in series with the energization supplied to circuits of the second polyphase relay element, means energizing said second compensator in accordance with a line current of said transmission line for response to a function of the impedance of said transmission line under balanced fault conditions to provide protection against balanced faults occurring in a portion of the transmission line, a plurality of ineffective inverse-time-delay overcurrent relay means each resepsonsive for operation when in effective condition to a separate one of the line currents of the transmission line, means responsive to operation of any of said relay elements for placing in effective condition each of the overcurrent relay means for which power flow in the associated phase of the transmission line is in a predetermined direction, and common protective translating means similarly responsive to operation of each of said overcurrent relay means.

9. A protective-relaying combination located at a relay station for responding to certain faults on a three-phase transmission line including means energized from the line voltage at the relaying station for producing a set of derived polyphase voltages having a phase-sequence corresponding to the line voltages, a relay unit comprising compensating means including a first compensator connected in series with one of said derived voltages and having substantially the same impedance angle as the line impedance of said transmission line for producing a set of compensated polyphase voltages, means for energizing the compensator in accordance with line current flowing in the corresponding line-conductor of the three-phase transmission line, a first polyphase relay element energized from said compensated polyphase voltages for response to a function of the impedance of said transmission line under unbalanced-fault conditions to provide protection against unbalanced faults occurring on a portion of the transmission line, a second polyphase relay element, means energizing the circuits of the second polyphase relay element in accordance with voltages derived from said transmission line, compensating means including a second compensator connected in series with the energization supplied to circuits of the second polyphase relay element, means energizing said second compensator in accordance with a line current of said transmission line for response to a function of the impedance of said transmission line under balanced fault conditions to provide protection against balanced faults occurring in a portion of the transmission line, a plurality of ineffective inverse-time-delay overcurrent relay means each responsive for operation when in effective condition to a separate one of the line currents of the transmission line, a separate directional relay means for each phase of the transmission line responsive to the direction of power flow in the associated phase and associated with one of the overcurrent relay means, means responsive to operation of any of said directional relay means for placing in effective condition the associated overcurrent relay means, and common protective translating means similarly responsive to operation of each of said overcurrent relay means, and to operation of each of the relay elements.

10. In a relaying assembly, a first three-phase relay unit for protecting a polyphase alternating-current electrical system responsive for operation when energized by alternating voltage and current quantities occurring during line-to-line fault conditions of a three-phase alternating-current electrical system only to a magnitude of a function of impedance having a predetermined angle which falls in a range extending between a first magnitude and a second magnitude, a second three-phase relay unit responsive for operation when energized by alternating voltage and current quantities occurring during faults involving three lines of a three-phase alternating current electrical system to a magnitude of a function of impedance, a plurality of directional time-delay relay means each responsive to the direction and magnitude of line current in a separate phase of the three-phase alternating-current electrical system with a time delay which varies inversely relative to the magnitude of the energization of such time-delay relay means, and translating means independently responsive to operation of each of the time-delay relay means, and of each of said relay units.

11. In a relaying assembly, a first three-phase relay unit for protecting a polyphase alternating-current electrical system responsive when energized by alternating voltage and current quantities occurring during line-to-line fault conditions of a three-phase alternating current electrical system only to a magnitude of a function of impedance having a predetermined angle which falls in a range extending between a first magnitude and a second magnitude, a second three-phase relay unit responsive for operation when energized by alternating voltage and current quantities occurring during faults involving three lines of a three-phase alternating current electrical system to a magnitude of a function of impedance, three directional inverse-time-delay overcurrent relay means each having a time delay in operation which varies inversely relative to the energization of such overcurrent relay unit, and translating means responsive to operation of the overcurrent relay means.

12. In a relaying system for protecting a three-phase electrical system, a plurality of terminals for connection to a three-phase electrical system, a first relay unit responsive for operation only to a magnitude of a function of impedance having a predetermined angle which falls in a first range extending between a first magnitude and a second magnitude for detecting balanced faults on a three-phase electrical system when the relay unit is energized by alternating voltage and current quantities derived from such polyphase electrical system through said terminals, and a second three-phase relay unit responsive for operation to any magnitude of a function of impedance having said predetermined angle and falling within a range extending between said first and second magnitudes for detecting unbalanced faults on a three-phase electrical system when the second relay unit is energized by alternating voltage and current quantities derived from such three-phase electrical system through said terminals, and a plurality of directional inverse-time-delay overcurrent relay means, each of the overcurrent relay means being responsive to the direction and magnitude of a separate line current of a three-phase electrical system when such system is connected to said terminals.

References Cited by the Examiner
UNITED STATES PATENTS

| | | | |
|---|---|---|---|
| 2,561,998 | 7/51 | Sonneman | 317—29 X |
| 2,697,187 | 12/54 | Sonneman | 317—157 |
| 2,973,459 | 2/61 | Sonneman | 317—47 |

SAMUEL BERNSTEIN, *Primary Examiner.*